US009500800B2

(12) United States Patent
Kuromizu

(10) Patent No.: US 9,500,800 B2
(45) Date of Patent: Nov. 22, 2016

(54) LIGHT SOURCE DEVICE AND DISPLAY DEVICE

(71) Applicant: Sakai Display Products Corporation, Sakai-shi, Osaka (JP)

(72) Inventor: Yasumori Kuromizu, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 93 days.

(21) Appl. No.: 14/400,762

(22) PCT Filed: Mar. 12, 2013

(86) PCT No.: PCT/JP2013/056856
§ 371 (c)(1),
(2) Date: Nov. 12, 2014

(87) PCT Pub. No.: WO2014/141391
PCT Pub. Date: Sep. 18, 2014

(65) Prior Publication Data
US 2015/0124482 A1 May 7, 2015

(51) Int. Cl.
*F21V 8/00* (2006.01)
(52) U.S. Cl.
CPC ........... *G02B 6/0088* (2013.01); *G02B 6/0055* (2013.01); *G02B 6/0086* (2013.01)
(58) Field of Classification Search
CPC .... G02B 6/0088; G02B 6/0055; G02B 6/86; G02B 6/00; F21V 17/00; F21V 7/0008; F21V 2200/00; F21V 2200/20; F21V 8/00
See application file for complete search history.

(56) References Cited

U.S. PATENT DOCUMENTS

| 8,282,262 B2* | 10/2012 | Matsui | G02B 6/0091 362/294 |
| 8,421,947 B2* | 4/2013 | Cho | G02F 1/133615 349/58 |
| 8,456,592 B2* | 6/2013 | Go | G02F 1/133308 349/58 |
| 8,934,070 B2* | 1/2015 | Jung | G02B 6/0091 349/58 |
| 9,013,652 B2* | 4/2015 | Tomomasa | G02B 6/0078 349/58 |

(Continued)

FOREIGN PATENT DOCUMENTS

JP 09-185056 7/1997
JP 2001-325820 11/2001

(Continued)

*Primary Examiner* — Bao Q Truong
(74) *Attorney, Agent, or Firm* — Rudy J. Ng; Bret E. Field; Bozicevic, Field & Francis LLP

(57) ABSTRACT

Provided are a light source device and a display device capable of preventing the user from recognizing unevenness in luminance due to reflection, by a reflection sheet, of the unevenness in luminance occurring at a cut-out part of a light guide plate. For cut-out parts formed on a light guide plate and a reflection sheet, respectively, to correspond to a positioning part which is located in a housing accommodating, in a stacked manner, the light guide plate and the reflection sheet for reflecting light entering the light guide plate to one surface side, the reflection sheet being located on another surface side of the light guide plate, and which determines a position of the light guide plate and the reflection sheet in the housing, the cut-out part of the light guide plate is configured to be included in the cut-out part of the reflection sheet in the direction of stack, thereby preventing unevenness in luminance occurring at the cut-out part of the light guide plate from being reflected to the side of one surface of the light guide plate.

17 Claims, 10 Drawing Sheets

(56) References Cited

U.S. PATENT DOCUMENTS

2010/0238367 A1* 9/2010 Montgomery ......... G02B 6/005
349/15
2011/0103092 A1 5/2011 Matsui

FOREIGN PATENT DOCUMENTS

| JP | 2011-096506 | 5/2011 |
| JP | 2012-084303 | 4/2012 |
| JP | 2013-026110 | 2/2013 |

* cited by examiner

F I G. 8
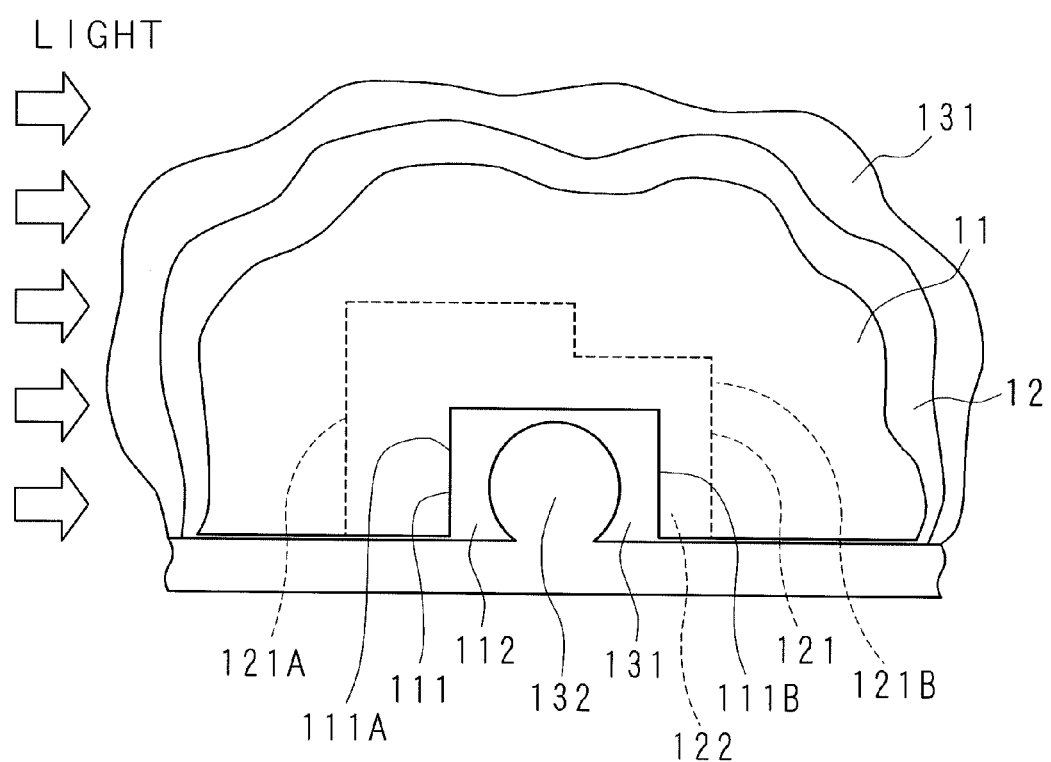

LIGHT SOURCE DEVICE AND DISPLAY DEVICE

This application is the national phase under 35 U.S.C. §371 of PCT International Application No. PCT/JP2013/056856 which has an International filing date of Mar. 12, 2013, and designated the United States of America.

BACKGROUND

1. Technical Field

The present invention relates to a light source device including a light guide plate, a reflection sheet for reflecting light entering the light guide plate to one surface side of the light guide plate, the reflection sheet being provided on the other surface side of the light guide plate, and a housing in which the light guide plate and the reflection sheet are stacked and accommodated, and to a display device including the light source device.

2. Description of Related Art

In recent years, a display device such as a liquid-crystal television has widely been spread. Such a display device includes a light guide plate, which planarly propagates therein the light from a light source and directs the light toward a display panel displaying an image. Meanwhile, it is necessary to prevent the light guide plate from being displaced in order to properly irradiate the display panel with light. In general, a positioning part is used to fix the position of the light guide plate, in which a cut-out part is formed at a position corresponding to the positioning part.

When, however, such a positioning part is used to fix the light guide plate, the light propagating inside the light guide plate is, for example, reflected by the positioning part, and the unintended reflection light around the cut-out part may be emitted through the light guide plate to the display panel, which has caused a problem of unevenness in luminance on the display panel.

Moreover, it is also necessary for a frame part covering the circumference of the display panel to have a predetermined width so as to prevent the user from recognizing such unevenness in luminance, which has resulted in a problem of substantial reduction in the area of a display screen viewed by the user.

To address the problems, Japanese Patent Application Laid-Open No. 2012-84303 discloses a light source module in which a positioning part is covered by a coating film with a reflectance ratio for the light from a light source smaller than that of the positioning part itself, so as to prevent unevenness in luminance due to reflection around a cut-out part of a light guide plate from occurring.

SUMMARY

However, the light source module in Patent Document 1 has such a problem that an additional process step is required for covering the positioning part with the coating film having a lower reflectance ratio in order to achieve the effect described above, which increases the manufacturing cost.

Moreover, in general, the side surfaces of a light guide plate are processed with a mirror finish, while the side surface concerning a cur-out part formed in the light guide plate is not processed with a mirror finish. Thus, when light from the light source enters the light guide plate, irregular reflection occurs at a side surface concerning the cut-out part which is not mirror-finished, causing unevenness in luminance between there and the other parts.

Such a problem can, however, not be overcome with the light source module in Japanese Patent Application Laid-Open No. 2012-84303.

The present invention has been made in view of the circumstances described above. An object of the invention is to provide a light source device and a display device capable of preventing unevenness in luminance occurring at a cut-out part of a light guide plate from being reflected to one surface side of the light guide plate due to the causes as described above and preventing the user from recognizing such unevenness in luminance, by configuring the cut-out part of the light guide plate to be included in a cut-out part of a reflection sheet, in the cut-out parts formed on the light guide plate and the reflection sheet, respectively, to correspond to a positioning part which is located in a housing accommodating, in a stacked manner, the light guide plate and the reflection sheet located on the other surface side of the light guide plate, for reflecting light entering the light guide plate to the one surface, and which determines a position of the light guide plate and the reflection sheet in the housing.

A light source device according to the present invention comprising a light guide plate, a reflection sheet for reflecting light entering the light guide plate to one surface side thereof, which is located on the other surface side of the light guide plate, and a housing in which the light guide plate and the reflection sheet are stacked and accommodated, is characterized by comprising: a positioning part located in the housing for determining positions of the light guide plate and the reflection sheet in the housing; and a cut-out part formed to be corresponding to the positioning part at each of the light guide plate and the reflection sheet, wherein the cut-out part of the light guide plate is configured to be included in the cut-out part of the reflection sheet in a direction of stack.

According to the present invention, the cut-out part formed at the light guide plate to correspond to the positioning part is configured to be included in the cut-out part formed at the reflection sheet in the direction of stack, thereby, even if unevenness in luminance occurs at the cut-out part of the light guide plate, avoiding reflection of such unevenness in luminance to one surface side of the light guide plate, which prevents the user from recognizing such unevenness in luminance when an image is displayed using the light from the one surface of the light guide plate.

The light source device according to the present invention is characterized in that an area of a recess defined by a cut-out part of the reflection sheet is partially enlarged in the direction of the stack based on an incident direction of the light.

According to the present invention, as unevenness in luminance may occur more frequently at a portion of the cut-out part of the light guide plate which is closer to a side from which the light enters, i.e. the side of the incident light, the cut-out part of the reflection sheet is so formed that the area of a recess defined by the cut-out part of the reflection sheet is larger at the portion closer to the side of the incident light than the portion farther from the side of the incident light.

The light source device according to the present invention is characterized in that the cut-out part of the reflection sheet has a shape similar to a shape of the cut-out part of the light guide plate in the direction of stack.

According to the present invention, the cut-out part of the reflection sheet is formed to have a shape similar to that of the cut-out part of the light guide plate in the direction of stack, thereby more uniformly suppressing the reflection of unevenness in luminance occurring at the cut-out part of the light guide plate to the one surface side.

The light source device according to the present invention is characterized in that the cut-out part of the light guide plate has a shape similar to a shape of the positioning part in the direction of stack.

According to the present invention, the cut-out part of the light guide plate is formed to have a shape similar to that of the positioning part in the direction of stack, so that the amount of light re-entering the light guide plate after being reflected by the positioning part is made uniform at the entire cut-out part of the light guide plate.

The light source device according to the present invention is characterized in that a bottom of the housing has a reflectance ratio lower than a reflectance ratio of the reflection sheet.

According to the present invention, the bottom of the housing is configured to have a reflectance ratio lower than that of the reflection sheet, so that the light concerning the unevenness in luminance occurring at the cut-out part of the light guide plate enters the bottom of the housing through a recess defined by the cut-out part of the light guide plate and a recess defined by the cut-out part of the reflection sheet, and is absorbed therein.

The light source device according to the present invention is characterized in that a film having a reflectance ratio lower than the reflectance ratio of the reflection sheet is formed at the bottom of the housing.

According to the present invention, the film having a reflectance ratio lower than that of the reflection sheet is formed at the bottom of the housing, so that the light concerning the unevenness in luminance occurring at the cut-out part of the light guide plate, when entering the bottom of the housing through the recess defined by the cut-out part of the light guide plate and the recess defined by the cut-out part of the reflection sheet, is absorbed by the film.

A display device according to the present invention is characterized by comprising: the light source device according to any one of the inventions described above; and a display panel located on one surface side of the light guide plate, for displaying an image using light entering through the light guide plate.

According to the present invention, using the light emitted from the one surface of the light guide plate of the light source device and entering the display panel, the display panel displays a predetermined image.

The light source device according to the present invention is characterized in that the light guide plate is subjected to a mirror finish on a side surface concerning the cut-out part.

According to the present invention, the mirror finish is performed on the side surface of the light guide plate concerning the cut-out part, so as to avoid irregular reflection at the cut-out part and to prevent unevenness in luminance from occurring around the cut-out part.

The light source device according to the present invention is characterized in that the bottom of the housing has a constant reflection spectral distribution characteristic.

According to the present invention, the bottom of the housing has a constant reflection spectral distribution characteristic, thereby suppressing occurrence of undesired color unevenness on the display.

The light source device according to the present invention is characterized in that the bottom of the housing is located away from the reflection sheet in the direction of stack.

According to the present invention, the bottom of the housing is located away from the reflection sheet in the direction of stack. Therefore, when the light concerning the unevenness in luminance occurring at the cut-out part of the light guide plate enters the bottom of the housing through the recess defined by the cut-out part of the light guide plate and the recess defined by the cut-out part of the reflection sheet, an area of the bottom which is able to absorb the light may be increased.

The light source device according to the present invention is characterized in that the above-described one surface of the light guide plate has a shape of a lens.

According to the present invention, since a lens shape is formed on the one surface of the light guide plate, the straightness of the light entering the light guide plate from the light source is enhanced, the amount of the light emitted through the above-described one surface is increased, and the amount of light traveling toward the cut-out part side of the light guide plate is reduced.

The light source device according to the present invention is characterized in that the above-described the other surface of the light guide plate has a shape of a lens.

According to the present invention, since a lens shape is formed on the other surface of the light guide plate, the straightness of the light entering the light guide plate from the light source is enhanced, the amount of the light emitted through the above-described one surface is increased, and the amount of light traveling toward the cut-out part side of the light guide plate is reduced.

The light source device according to the present invention is characterized in that the light guide plate has a rectangular shape, the cut-out part of the light guide plate is formed at an edge of one side surface of the light guide plate, and the light source device comprises a light source arranged on a side surface adjacent to the above-described one side surface and located closer to a center of the light guide plate compared to the cut-out part in a direction in which the one side surface and another side surface opposite to the one side surface oppose to each other.

According to the present invention, the light source is positioned closer to the center of the light guide plate compared to the cut-out part in the direction in which the above-described one side surface opposes to the above-described another side surface, thereby reducing the rate of light traveling toward the cut-out part among the light entering the light guide plate from the light source.

The light source device according to the present invention is characterized in that the reflection sheet has a rectangular shape, the cut-out part of the reflection sheet is formed at a portion of one edge of the reflection sheet, and the light source device comprises a light source arranged on an edge side adjacent to said one edge and located closer to the center of the reflection sheet compared to the cut-out part in a direction in which the one edge and another edge opposite to the one edge oppose to each other.

According to the present invention, the cut-out part of the light guide plate is included inside the cut-out part of the reflection sheet in the direction of stack, and the light source is located closer to the center of the reflection sheet compared to the cut-out part in the direction in which the above-described one edge opposes to the above-described another edge. This further reduces the rate of the light traveling toward the cut-out part of the light guide plate among the light entering the light guide plate from the light source, thereby suppressing the unevenness in luminance around the cut-out part being reflected to the one surface side of the light guide plate by the reflection sheet.

According to the present invention, unevenness in luminance caused at the cut-out part of the light guide plate by the causes as described above is prevented from being reflected on the one surface side of the light guide plate, thereby preventing the user from recognizing such unevenness in luminance and feeling uncomfortable.

In addition, the width of a frame part covering the circumference of the display panel may be reduced so as to increase the area of a display screen viewed by the user.

The above and further objects and features will move fully be apparent from the following detailed description with accompanying drawings.

BRIEF DESCRIPTION OF THE SEVERAL VIEWS OF THE DRAWINGS

FIG. 8 is a partial schematic view from the direction of stack, schematically illustrating the state of accommodating a light guide plate and a reflection sheet in a liquid-crystal television according to Embodiment 4 of the present invention.

DETAILED DESCRIPTION

Examples where a light source device and a display device according to embodiments of the present invention are applied to a liquid-crystal television provided with a so-called liquid-crystal display panel will now be described below in detail with reference to the drawings.

Embodiment 1

Figure 1:
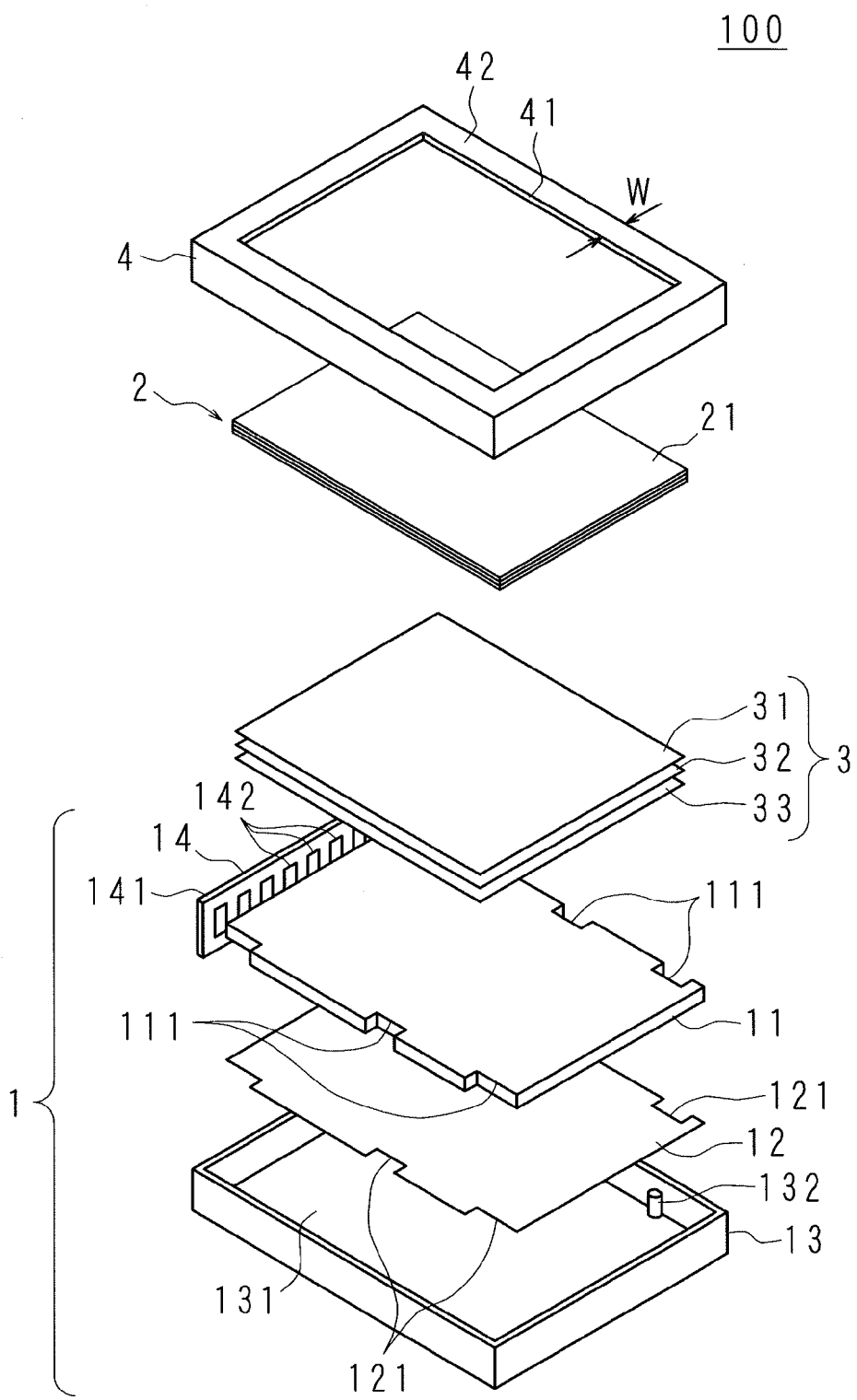
FIG. 1 is an exploded perspective view illustrating a main part of a liquid-crystal television according to Embodiment 1 of the present invention.

FIG. 1 is an exploded perspective view illustrating a main part of a liquid-crystal television according to Embodiment 1 of the present invention. In the drawing, a reference numeral 100 denotes a liquid-crystal television. As illustrated in FIG. 1, the liquid-crystal television 100 includes, for example, a light source device 1, a liquid-crystal display panel 2, an optical sheet 3, and a front housing 4 accommodating the liquid-crystal panel 2 and optical sheet 3.

The light source device 1 further includes a light source unit 14, a light guide plate 11 guiding light entering from the light source unit 14 to one surface thereof at the liquid-crystal panel 2 side, a reflection sheet 12 reflecting the light entering from the light source unit 14 toward the one surface of the light guide plate 11, and a back housing 13 accommodating the light source unit 14, light guide plate 11 and reflection sheet 12.

The front housing 4 is disposed at the front side of the liquid-crystal display panel 2 on which an image is displayed. The front housing 4 has a box shape with a rectangular bottom which conforms to the shape of one surface 21 of the liquid-crystal display panel 2 viewed by the user, and a rectangular display window 41 is opened at the bottom. The user can view an image displayed on one surface 21 of the liquid-crystal display panel 2 through the display window 41.

The front housing 4 has a predetermined width W from the edge of the bottom to the edge of the display window 41. In other words, in the bottom of the front housing 4, a residual portion excluding the display window 41 forms a hollow rectangular frame part 42.

The circumferential part of one surface 21 of the liquid-crystal display panel 2 is covered by the frame part 42, while the other surface side of the liquid-crystal display panel 2 is provided with an optical sheet 3, one surface of the optical sheet 3 being so arranged to be opposite to the other surface of the liquid-crystal display panel 2.

The liquid-crystal display panel 2 is, for example, an active matrix type, which is provided with a transparent substrate on the side of one surface 21 and a transparent substrate on the side of the other surface that are so arranged to be opposite to each other with a predetermined gap therebetween, the gap between the transparent substrates being sealed with liquid crystal. A polarization plate (not illustrated) is placed between the transparent substrate on the other surface side and the optical sheet 3.

The light guide plate 11 of the light source device 1 is placed on the other surface side of the optical sheet 3, the above-described one surface of the light guide plate 11 being arranged to be opposite to the other surface of the optical sheet 3.

The optical sheet 3 is a known sheet which directs the light emitted from the light source unit 14 toward the liquid-crystal panel 2 after diffusing and condensing the light. For example, the optical sheet 3 is constituted by multiple optical sheets, including a first diffusion sheet 31 disposed on the side of the liquid-crystal display panel 2 (polarization plate), a second diffusion sheet 33 disposed on the side of the light guide plate 11, and a prism sheet 33 interposed between the first and second diffusion sheets.

The second diffusion sheet 33 is an optical sheet for diffusing the light entering from the light source unit 14 through the light guide plate 11 and making it enter the prism sheet 32. Moreover, the prism sheet 32 is an optical sheet for condensing the light entering through the second diffusion sheet 33 and directing the light to the liquid-crystal display panel 2. The light passed through the prism sheet 32 enters the first diffusion sheet 31 vertically to the prism sheet 32. The first diffusion sheet 31 is an optical sheet for further diffusing the light entering through the prism sheet 32 and directing the light toward the liquid-crystal display panel 2 with a more uniform luminance distribution.

The light source device 1 is a so-called edge-light system, and has a light source unit 14, a light guide plate 11 disposed at the other surface side of the optical sheet 3, and a reflection sheet 12 placed on the other surface side of the light guide plate 11. The reflection sheet 12 is so arranged that one surface thereof is opposite to the other surface of the light guide plate 11. The light guide plate 11 and reflection sheet 12 are accommodated in the back housing 13 while being stacked.

The light guide plate 11 is comprised of, for example, a rectangular acrylic resin having a high transparency, which has a predetermined thickness, and guides the light emitted by the light source unit 14 to the optical sheet 3 (liquid-crystal panel 2). For example, the light guide plate 11 may be so configured that one surface thereof opposing the other surface of the optical sheet 3 has an emitting surface on which a pattern is formed so that the light entering from the light source unit 14 travels toward the liquid-crystal panel 2. This allows the light guide plate 11 to convert the light entering from the light source unit 14 into planar light and to uniformly transmit the light to the optical sheet 3 through the emitting surface. Note that the reflection sheet 12 is provided on the other surface of the light guide plate 11.

Furthermore, the light guide plate 11 is provided with cut-out parts 111, 111 . . . 111 at both edges on the long side thereof corresponding to positioning parts 132, 132 . . . 132 which are located at the back housing 13 and will be described later. For example, the cut-out parts 111, 111 . . . 111 are formed at both ends and the center of each of the long side edges of the light guide plate 11, each having a U shape in the thickness direction of the light guide plate 11.

A mirror finish is applied on each of the four side surfaces of the light guide plate 11 except for the side surfaces concerning the cut-out part 111. A part of the light entering from the light source unit 14 freely passes through the four side surfaces to the outside. On the other hand, as the side surfaces concerning the cut-out part 111 are not processed with a mirror finish, a part of the light entering from the light source unit 14 is irregularly reflected at the side surfaces concerning the cut-out part 111.

Moreover, the reflection sheet 12 has a rectangular shape with a dimension substantially equal to that of the light guide plate 11, which irregularly reflects the light entering the light guide plate 11 from the light source unit 14 and the light is emitted through the emitting surface of the light guide plate 11.

Also in the reflection sheet 12, as in the light guide plate 11, cut-out parts 121, 121 . . . 121 corresponding to the positioning parts 132, 132 . . . 132 of the back housing 13 are formed at each of the edges on the long sides thereof. For example, each of the cut-out parts 121, 121 . . . 121 has a U shape in the thickness direction of the reflection sheet 12.

It is noted that the light guide plate 11 and the reflection sheet 12 are so configured that, when accommodated in the back housing 13, the positions of the cut-out parts 111, 111 . . . 111 are aligned with the corresponding cut-out parts 121, 121 . . . 121 in the direction of stack.

The light source unit 14 is placed in the vicinity of one side surface of a short side of the light guide plate 11. The light source unit 14 has a substrate 141 arranged to be opposite to the one side surface of the light guide plate 11, and light sources 142, 142, . . . 142 mounted on the substrate 141 and disposed side by side along the one side surface of the light guide plate 11. The light sources 142, 142, . . . 142 may be, for example, a light-emitting diode (LED), a cold cathode fluorescence lamp (CCFL), a hot cathode fluorescent lamp (HCFL), an external electrode fluorescent lamp (EEFL) or the like.

It is noted that the position of the light source unit 14 is not limited to be in the vicinity of the above-described one side surface of the light guide plate 11, but may also be in the vicinity of another side surface on a short side, or the vicinity of a side surface of a long side. The light source unit 14 may be placed not only at one part but also at several parts.

In other words, the light source units 14 may be located in the vicinity of the side surfaces of both long sides of the light guide plate 11, or may be located in the vicinity of the side surfaces of both short sides of the light guide plate 11. Furthermore, the configuration is not limited thereto, and the light source units 14 may be provided in the vicinity of the four side surfaces of the light guide plate 11, respectively.

The back housing 13 has a box shape having a rectangular bottom 131 conforming to the shape of the reflection sheet 12, in which positioning parts 132, 132, . . . 132, for determining the positions of the light guide plate 11 and reflection sheet 12 when accommodated in the back housing 13, are formed in multiple parts. Each positioning part 132 has a cylindrical shape with its central axis parallel to the direction of stack, and is located at inside side surface of the back housing 13. The cut-out parts 111, 111 . . . 111 of the light guide plate 11 and the cut-out parts 121, 121 . . . 121 of the reflection sheet 12 are so formed as to correspond to the positioning parts 132, 132 . . . 132 of the back housing 13.

The bottom 131 of the back housing 13 is configured to have a reflectance ratio lower than that of the reflection sheet 12. At the bottom 131, for example, a black film is coated on the entire bottom or at least a portion corresponding to a reflection sheet recess 122 which will be described later.

In addition thereto, a reception part (not illustrated) for receiving television broadcasts is accommodated in the back housing 13. The image concerning the television broadcasts received by the reception part is displayed on one surface 21 of the liquid-crystal display panel 2.

The light guide plate 11 and reflection sheet 12 are stacked in such a manner that the one surface of the reflection sheet 12 is opposed to the above-described other surface of the light guide plate 11, and are accommodated in the back housing 13 in the state where the other surface of the reflection sheet 12 is opposed to the bottom 131 of the back housing 13. Here, as described above, the positions of the light guide plate 11 and reflection sheet 12 when accommodated in the back housing 13 are decided by the positioning parts 132, 132 . . . 132.

Figure 2:
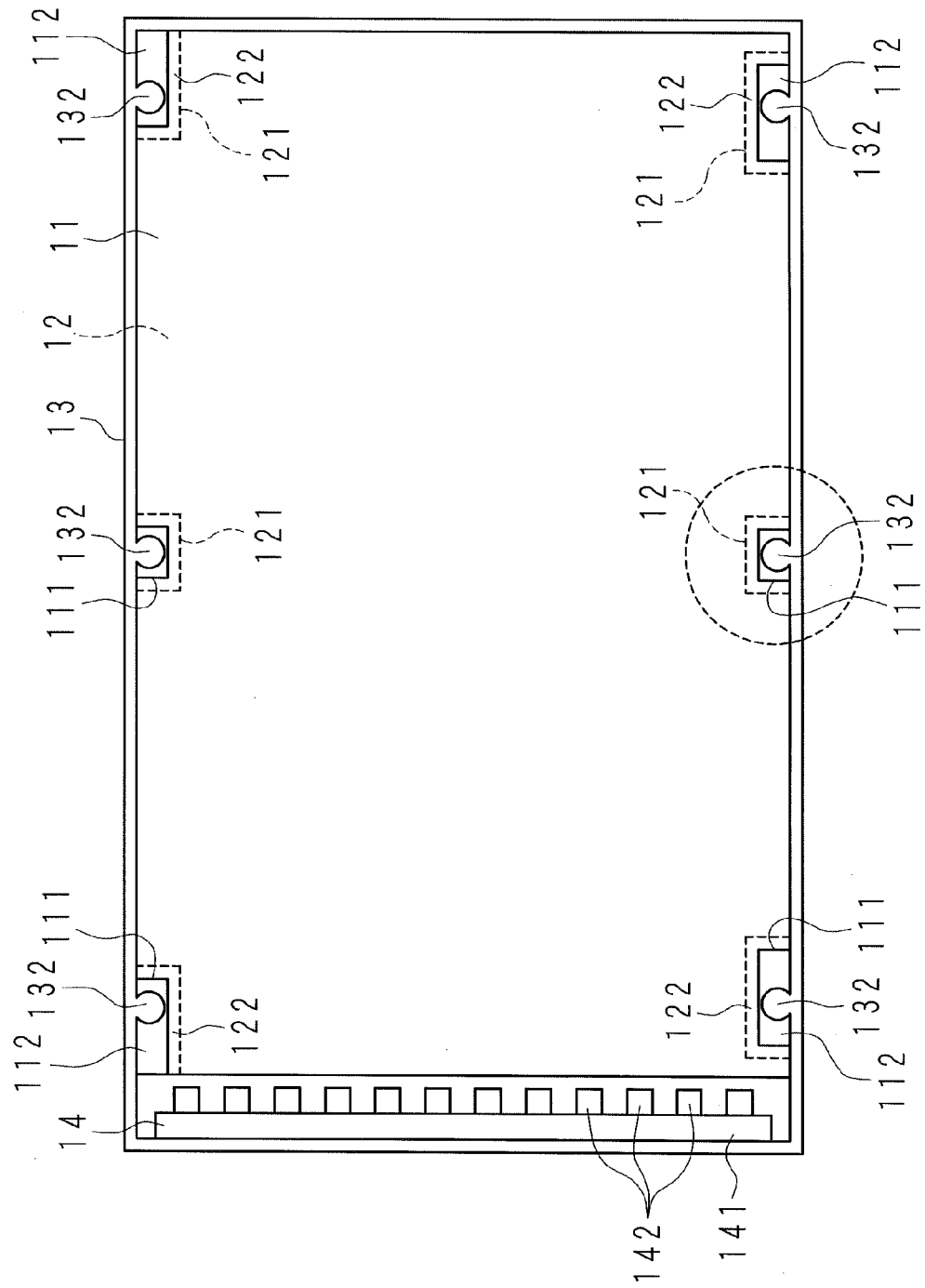
FIG. 2 is a schematic view from the direction of stack schematically illustrating the state of accommodating a light guide plate and a reflection sheet in the liquid-crystal television according to Embodiment 1 of the present invention.
Figure 3:
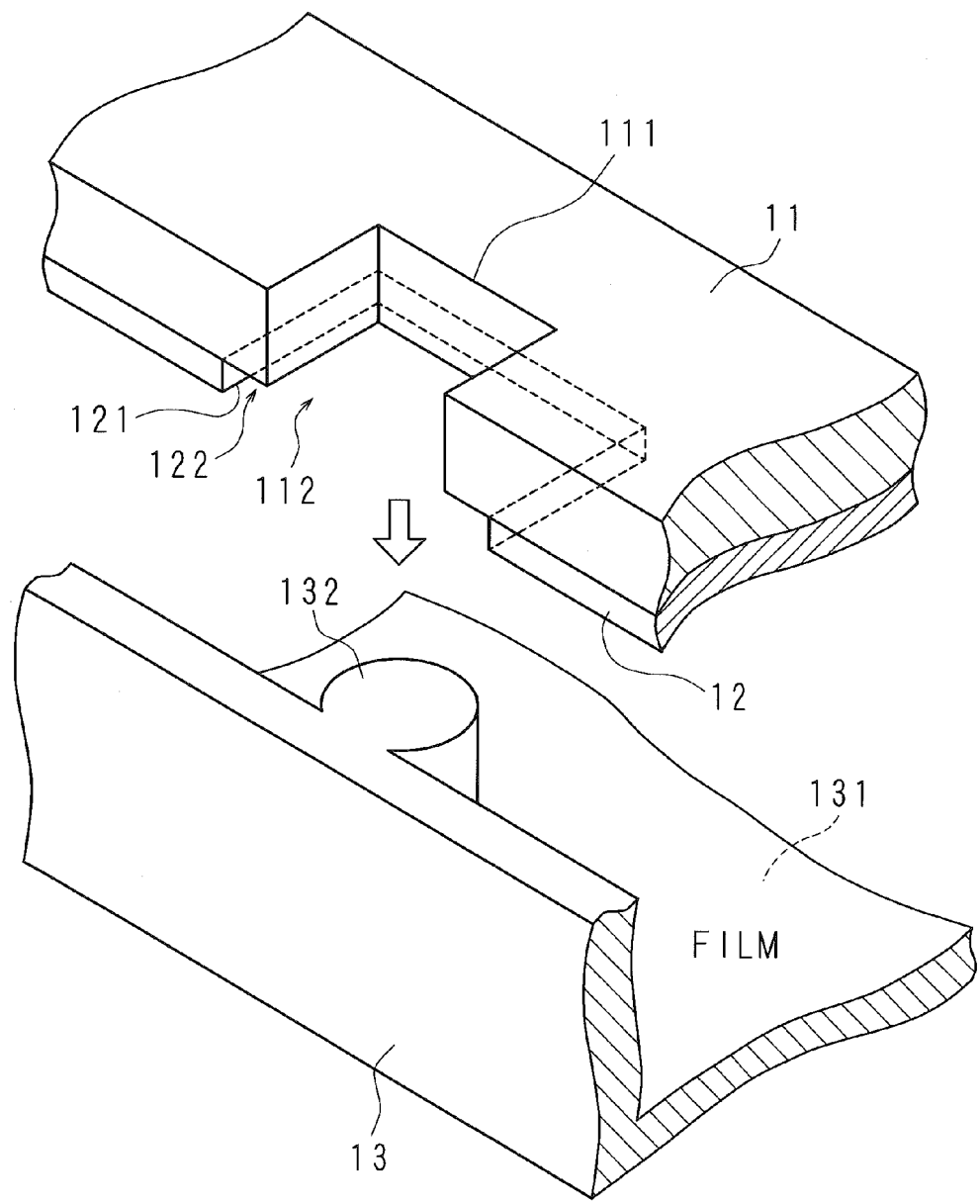
FIG. 3 is an explanatory view illustrating the positional relationship among the light guide plate, the reflection sheet and a positioning part in the liquid-crystal television according to Embodiment 1 of the present invention.
Figure 4:
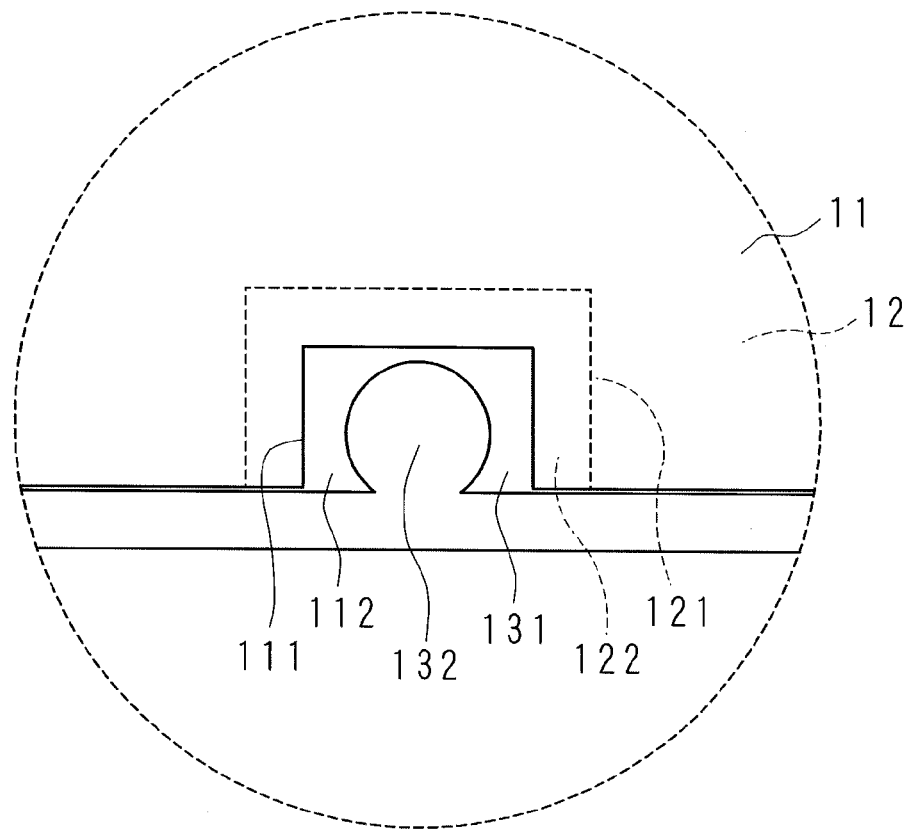
FIG. 4 is an enlarged view illustrating an enlarged circular portion in FIG. 2.

FIG. 2 is a schematic view from the direction of stack schematically illustrating an accommodation state of the light guide plate 11 and reflection sheet 12 in the liquid-crystal television 100 according to Embodiment 1 of the present invention. FIG. 3 is an explanatory view illustrating the positional relationship among the light guide plate 11, reflection sheet 12 and positioning part 132. FIG. 4 is an enlarged view with an enlarged circular portion in FIG. 2.

In light guide plate recesses 112, 112, . . . 112 formed by forming the cut-out parts 111, 111, . . . 111 at the light guide plate 11 and in reflection sheet recesses 122, 122, . . . 122 formed by forming the cut-out parts 121, 121, . . . 121 at the reflection sheet 12, positioning parts 132, 132, . . . 132 are located, which prevents displacement of the light guide plate 11 and reflection sheet 12.

As described above, the cut-out part 111 has a U shape in the direction of stack of the light guide plate 11 and reflection sheet 12 (hereinafter simply referred to as direction of stack), while the shape of the cut-out part 121 in the direction of stack is also a U shape similar to the cut-out part 111. In other words, the light guide plate recess 112 has a rectangular shape in the direction of stack, while the reflection sheet recess 122 also has a rectangular shape in the direction of stack, which conforms to the light guide plate recess 112.

It is so configured that the reflection sheet recess 122 has wider area than the light guide plate recess 112, and the position of the cut-out part 121 of the reflection sheet 12 is aligned with the position of the cut-out part 111 of the light guide plate 11.

In other words, as illustrated in FIG. 4, as for the direction of stack, it is so configured that the cut-out part 111 of the light guide plate 11 is included inside the cut-out part 121 of the reflection sheet 12. In the direction of stack, the cut-out part 121 of the reflection sheet 12 and the cut-out part 111 of the light guide plate 11 have different areas. That is, in the direction of stack, the light guide plate recess 112 is located inside the reflection sheet recess 122, while the bottom 131 of the back housing 13 is exposed through the light guide plate recess 112 and the reflection sheet recess 122.

The liquid-crystal television 100 according to Embodiment 1 of the present invention has the configuration as described above, which can solve a problem of unevenness in light occurring in the vicinity of the cut-out part 111, or a problem of the reduced area of the display window 41 resulting from the necessity of increased width W in the frame part 42 so as to conceal such unevenness in light, as described above. This will be described below in detail.

Though the light entering the light guide plate 11 from the light source unit 14 is reflected toward the emitting surface of the light guide plate 11 by the reflection sheet 12, a part of the light passes through the side surfaces of the light guide plate 11 to the outside. Among such part of light, the light passing through the side surfaces concerning the cut-out part 111 which are not mirror-finished causes irregular reflection at the side surfaces. That is, irregular reflection of light occurs at the side surfaces concerning the cut-out part 111 of the light guide plate 11, and thus the portion along the side surfaces concerning the cut-out part 111 is excessively illuminated compared to the other parts of the light guide plate 11, causing unevenness in luminance.

Moreover, the part of light passed through the side surface concerning the cut-out part 111 to the outside may be reflected by the positioning part 132 and may enter from the side surface concerning the cut-out part 111 again. In such a case, when the distance from the positioning part 132 to the side surface concerning the cut-out part 111 varies in every parts, the amount of re-entering light also varies in every parts of the side surface concerning the cut-out part 111, further adding the unevenness in luminance at the portion along the side surface concerning the cut-out part 111 of the light guide plate 11.

Moreover, such unevenness in luminance at the portions along the side surface concerning the cut-out part 111 also causes unevenness in luminance on one surface 21 of the liquid-crystal display panel 2 when the light is reflected to the liquid-crystal display panel 2 by the reflection sheet 12, making the user feel uncomfortable.

To address this, the liquid-crystal television 100 according to the present invention is, as described above, so configured that the cut-out part 111 of the light guide plate 11 is included inside the cut-out part 121 of the reflection sheet 12 in the direction of stack, so that the reflection sheet 12 is not present near the cut-out part 111 on the other surface side of the light guide plate 11. Therefore, even if unevenness occurs due to irregular reflection caused at the portions along the side surfaces of the cut-out part 111 or due to the light re-entering from the side surface concerning the cut-out part 111 after being reflected by the positioning part 132, this will not be reflected to the liquid-crystal display panel 2. A substantially similar effect is attained at the portion along the side surface of the cut-out part 111, as the cut-out part 111 has a shape similar to that of the cut-out part 121 in the direction of stack.

Furthermore, a part of the light irregularly reflected at the portion along the side surface of the cut-out part 111 is absorbed by the bottom 131 of the back housing 13 which is exposed through the light guide plate recess 112 and reflection sheet recess 122, and the amount of the irregularly-reflected light is reduced.

Accordingly, in the liquid-crystal television 100 according to the present invention, unevenness in luminance does not occur on one surface 21 of the liquid-crystal display panel 2, preventing the user from feeling uncomfortable, and also reducing the width W in the frame part 42, which allows the user to enjoy a wider range of image.

Embodiment 2

While Embodiment 1 described an example where, in the direction of stack, the cut-out part 111 of the light guide plate 11 has a U shape and the cut-out part 121 of the reflection sheet 12 also has a U shape conforming to the cut-out part 111, the present invention is not limited thereto.

Figure 5:
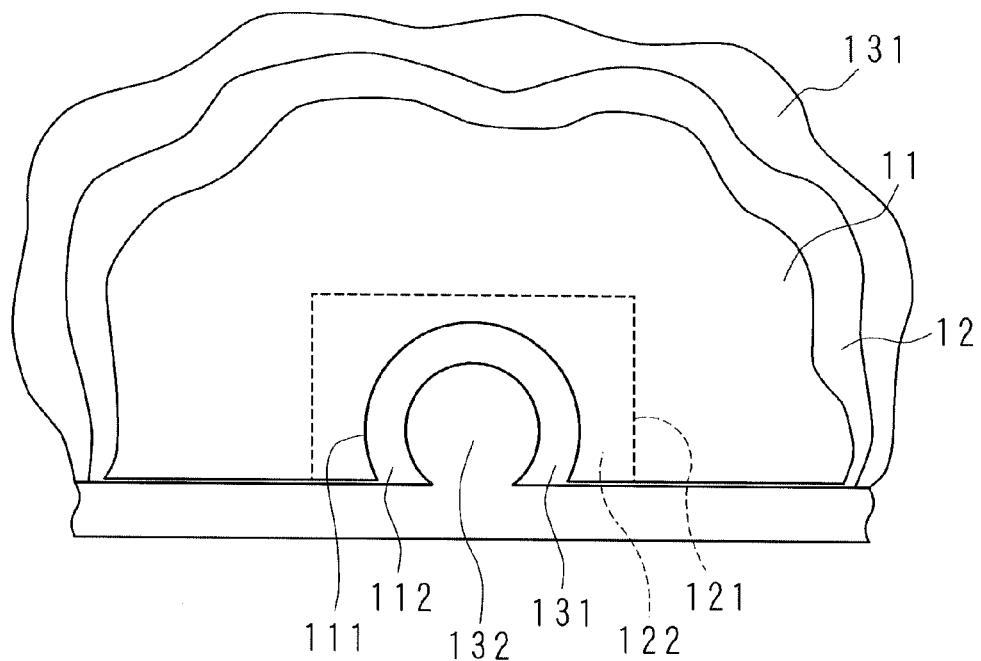
FIG. 5 is a partial schematic view from the direction of stack, schematically illustrating the state of accommodating a light guide plate and a reflection sheet in a liquid-crystal television according to Embodiment 2 of the present invention.

FIG. 5 is a partial schematic view from the direction of stack schematically illustrating the accommodation state of a light guide plate 11 and a reflection sheet 12 in a liquid-crystal television 100 according to Embodiment 2. In Embodiment 2, a positioning part 132 is configured, as in Embodiment 1, to have a cylindrical shape with its central axis being parallel to the direction of stack, and to be enclosed by a cut-out part 111 of the light guide plate 11 when the light guide plate 11 is accommodated in a back housing 13.

In other words, in the direction of stack, the cut-out part 111 has a substantially circular shape (or arc shape), which conforms to the positioning part 132, with a diameter larger than that of the positioning part 132. When the light guide plate 11 is accommodated in the back housing 13, the positioning part 132 is located in a light guide plate recess 112 of the light guide plate 11. Here, the positions of the cut-out part 111 (or light guide plate recess 112) and the positioning part 132 are aligned with each other in the direction of stack.

On the other hand, a cut-out part 121 of the reflection sheet 12 has a U shape in the direction of stack. Furthermore, it is so configured that the reflection sheet recess 122 has wider area than the light guide plate recess 112 in the direction of stack, and the position of the cut-out part 121 of the reflection sheet 12 is aligned with the position of the cut-out part 111 of the light guide plate 11.

Furthermore, as illustrated in FIG. 5, it is so configured that the cut-out part 111 of the light guide plate 11 is included inside the cut-out part 121 of the reflection sheet 12 in the direction of stack. In other words, in the direction of stack, the light guide plate recess 112 is located inside the reflection sheet recess 122, while the bottom 131 of the back housing 13 is exposed through the light guide plate recess 112 and the reflection sheet recess 122.

The liquid-crystal television 100 according to Embodiment 2 of the present invention has a configuration as described above, which can thus solve the problem of unevenness in light occurring in the vicinity of the cut-out part 111, or the problem of the reduced area of the display window 41 resulting from the increased width W in the frame part 42 to conceal such unevenness in light, as described above. This will be described below in detail.

A part of the light entering the light guide plate 11 from the light source unit 14 passes through the side surfaces of the light guide plate 11 to the outside. Among such part of light, the light passing through the side surface concerning the cut-out part 111 which is not mirror-finished causes irregular reflection at the side surface. Thus, the portion along the side surface concerning the cut-out part 111 is excessively illuminated compared to the other parts of the light guide plate 11, causing unevenness in luminance.

Moreover, the part of light passed through the side surface concerning the cut-out part 111 to the outside may be reflected by the positioning part 132 and may enter from the side surface concerning the cut-out part 111 again. In such a case, when the distance from the positioning part 132 to the side surface concerning the cut-out part 111 varies in every parts, the amount of re-entering light also varies in every parts of the side surface concerning the cut-out part 111, further adding the unevenness in luminance at the portion along the side surface concerning the cut-out part 111 of the light guide plate 11.

Moreover, such excessive light at the portions along the side surface concerning the cut-out part 111 also causes unevenness in luminance on one surface 21 of the liquid-crystal display panel 2 when the light is reflected to the liquid-crystal display panel 2 by the reflection sheet 12, making the user feel uncomfortable.

To address this, the liquid-crystal television 100 according to the present invention is, as described above, so configured that the cut-out part 111 of the light guide plate 11 is included inside the cut-out part 121 of the reflection sheet 12 in the direction of stack, so that the reflection sheet 12 is not present near the cut-out part 111 on the other surface side of the light guide plate 11. Therefore, even if irregular reflection occurs at the portions along the side surfaces of the cut-out part 111, such excessive light will not be reflected to the liquid-crystal display panel 2.

Moreover, as described above, the cut-out part 111 has a shape conforming to that of the positioning part 132 in the direction of stack, while these positions are aligned with each other and the positioning part 132 is located inside the light guide plate recess 112. That is, the distance from the positioning part 132 to the side surface concerning the cut-out part 111 is the same in anywhere on the side surface concerning the cut-out part 111. Therefore, the amount of light reflected at the positioning part 132 and entered is uniform on the side surface concerning the cut-out part 111. As such, the reflection of excessive light to the liquid-crystal display panel 2 at the portion along the side surfaces of the cut-out part 111 is restricted while the amount of reflection light is uniform, so that unevenness in luminance on one surface 21 of the liquid-crystal panel 2 can reliably be prevented.

Furthermore, a part of the light irregularly reflected at the portion along the side surfaces of the cut-out part 111 is absorbed by the bottom 131 of the back housing 13 which is exposed through the light guide plate recess 112 and reflection sheet recess 122, and thus the amount of the irregularly-reflected light is reduced.

Therefore, in the liquid-crystal television 100 according to the present invention, unevenness in luminance does not occur on one surface 21 of the liquid-crystal display panel 2, preventing the user from feeling uncomfortable, and also reducing the width W in the frame part 42, which allows the user to enjoy a wider range of image.

Parts that are similar to Embodiment 1 are denoted by the same reference numbers and will not be described in detail.

Embodiment 3

Though Embodiment 2 described the case where the shape of the cut-out part 111 of the light guide plate 11 has a substantially circular shape (or an arc shape) conforming to the positioning part 132, and where the cut-out part 121 of the reflection sheet 12 has a U shape in the direction of stack, the present invention is not limited thereto.

Figure 6:
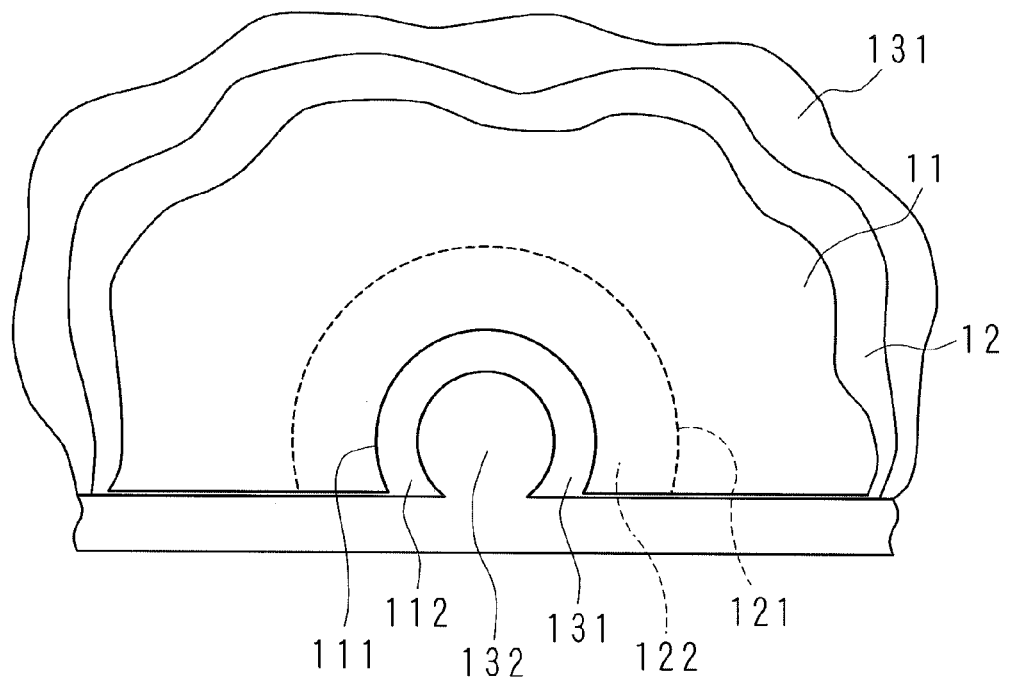
FIG. 6 is a partial schematic view from the direction of stack, schematically illustrating the state of accommodating a light guide plate and a reflection sheet in a liquid-crystal television according to Embodiment 3 of the present invention.

FIG. 6 is a partial schematic view from the direction of stack, schematically illustrating the state of accommodating a light guide plate 11 and a reflection sheet 12 in a liquid-crystal television 100 according to Embodiment 3 of the present invention.

In Embodiment 3, a positioning part 132 has a cylindrical shape with its central axis being parallel to the direction of stack, and a cut-out part 111 has a substantially circular shape (or arc shape) conforming to the positioning part 132 in the direction of stack and with a diameter larger than that of the positioning part 132. It is so configured that, when the light guide plate 11 is accommodated in a back housing 13, the positioning part 132 is located in a light guide plate recess 112 of the light guide pate 11 and the positioning part 132 is enclosed by the cut-out part 111.

Moreover, a cut-out part 121 of a reflection sheet 12 has a shape conforming to the cut-out part 111 of the light guide plate 11 in the direction of stack, and a substantially circular shape (or arc shape) with a diameter larger than that of the cut-out part 111. That is, the positioning part 132, cut-out part 111 and cut-out part 121 have similar shapes in the direction of stack.

It is so configured that the reflection sheet recess 122 is wider than the light guide plate recess 112, and that the positions of the cut-out part 121 of the reflection sheet 12, the cut-out part 111 of the light guide plate 11 and the positioning part 132 are aligned with one another in the direction of stack.

Furthermore, as illustrated in FIG. 6, it is so configured that the cut-out part 111 of the light guide plate 11 is included inside the cut-out part 121 of the reflection sheet 12 in the direction of stack. In other words, in the direction of stack, the light guide plate recess 112 is located inside the reflection sheet recess 122 while the bottom 131 of the back housing 13 is exposed through the light guide plate recess 112 and reflection sheet recess 122.

The liquid-crystal television 100 according to Embodiment 3 of the present invention has the configuration as described above, which can solve a problem of unevenness in light occurring in the vicinity of the cut-out part 111, or a problem of the reduced area of the display window 41 resulting from the increased width W in the frame part 42 to conceal such unevenness in light, as described above. This will be described below in detail.

Among the light entering the light guide plate 11 from the light source unit 14, the light passing through the side surface concerning the cut-out part 111 which is not mirror-finished causes irregular reflection at the side surface. Thus, the portion along the side surface concerning the cut-out part 111 is excessively illuminated compared to the other parts of the light guide plate 11, causing unevenness in luminance.

Furthermore, a part of the light passed through the side surface concerning the cut-out part 111 to the outside may be reflected by the positioning part 132 and may enter again from the side surface concerning the cut-out part 111. In such a case, when the distance from the positioning part 132 to the side surface concerning the cut-out part 111 varies in every parts, the amount of re-entering light also varies in every parts of the side surface concerning the cut-out part 111, further adding the unevenness in luminance at the portion along the side surface concerning the cut-out part 111 of the light guide plate 11.

Such excessive light at the portion along the side surface concerning the cut-out part 111 is reflected to the liquid-crystal display panel 2 by the reflection sheet 12, and causes unevenness in luminance on one surface 21 of the liquid-crystal display panel 2.

To address this, the liquid-crystal television 100 according to the present invention is, as described above, so configured that the cut-out part 111 of the light guide plate 11 is included inside the cut-out part 121 of the reflection sheet 12 in the direction of stack, so that the reflection sheet 12 is not present near the cut-out part 111 on the other side of the light guide plate 11. Therefore, even if irregular reflection occurs at the portions along the side surface of the cut-out part 111, such excessive light will not be reflected to the liquid-crystal display panel 2.

Moreover, as described above, the cut-out part 111 has a shape conforming to that of the positioning part 132 in the direction of stack, while these positions are aligned with each other and the positioning part 132 is located inside the light guide plate recess 112. That is, the distance from the positioning part 132 to the side surface concerning the cut-out part 111 is the same in anywhere on the side surface concerning the cut-out part 111. Therefore, the amount of light reflected at the positioning part 132 and entered is uniform on the side surface concerning the cut-out part 111. As such, the reflection of excessive light to the liquid-crystal display panel 2 at the portion along the side surface of the cut-out part 111 is restricted while the amount of entering reflection light is uniform, so that unevenness in luminance on one surface 21 of the liquid-crystal display panel 2 can reliably be prevented.

Moreover, as described above, in the direction of stack, the cut-out part 121 has a shape conforming to the cut-out part 111 and these positions are aligned with each other, while the light guide plate recess 112 is located in the reflection sheet recess 122. That is, the distance from the side surface concerning the cut-out part 111 to the edge concerning the cut-out part 121 is the same anywhere in the edge concerning the cut-out part 121. Accordingly, the reflection of excessive light at the portions along the side surface of the cut-out part 111 is restricted in a portion along the side surface of the cut-out part 111 at a similar degree.

Furthermore, a part of the light irregularly reflected at the portion along the side surface of the cut-out part 111 is absorbed by the bottom 131 of the back housing 13 exposed through the light guide plate recess 112 and the reflection sheet recess 122, reducing the amount of the irregularly reflected light.

Accordingly, in the liquid-crystal television 100 according to the present invention, unevenness in luminance does not occur on one surface 21 of the liquid-crystal display panel 2, preventing the user from feeling uncomfortable, and also reducing the width W in the frame part 42, which allows the user to enjoy a wider range of image display.

While Embodiments 1 to 3 described the case where the shape of the cut-out part 121 is similar to that of the cut-out part 111, the case where the shape of the cut-out part 111 is similar to that of the positioning part 132, and the case where the shapes of the cut-out part 111, cut-out part 121 and positioning part 132 are similar to one another, in the direction of stack, the present invention is not limited thereto.

Figure 7:
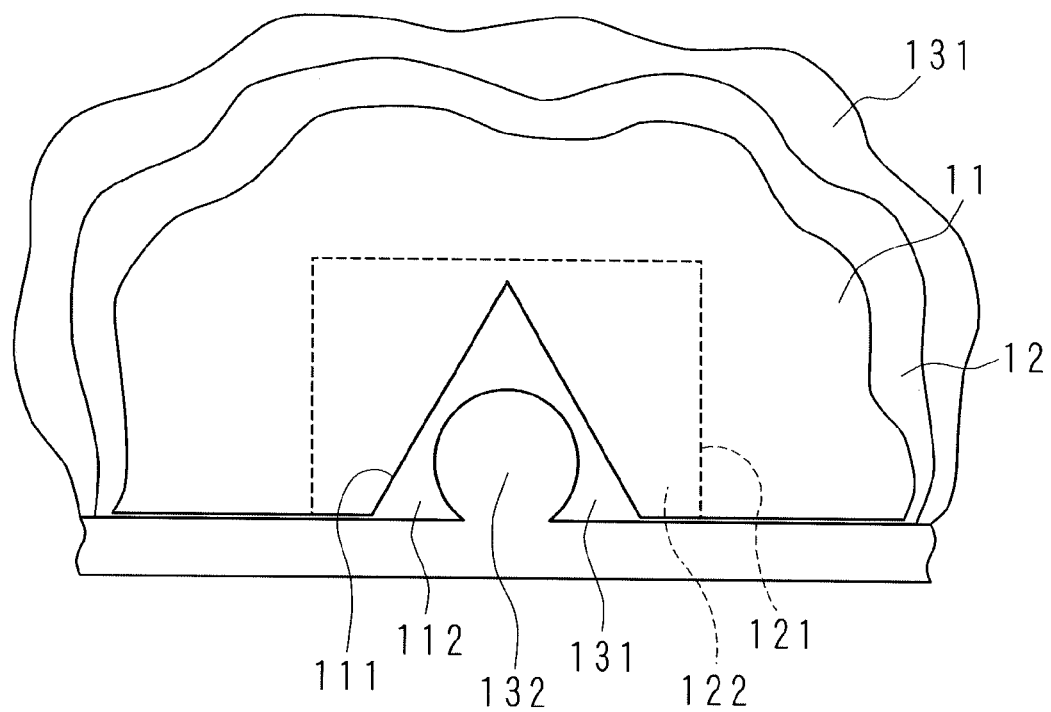
FIG. 7 is a partial schematic view from the direction of stack, schematically illustrating the state of accommodating a light guide plate and a reflection sheet in a liquid-crystal television according to another embodiment of the present invention.
Figure 9:
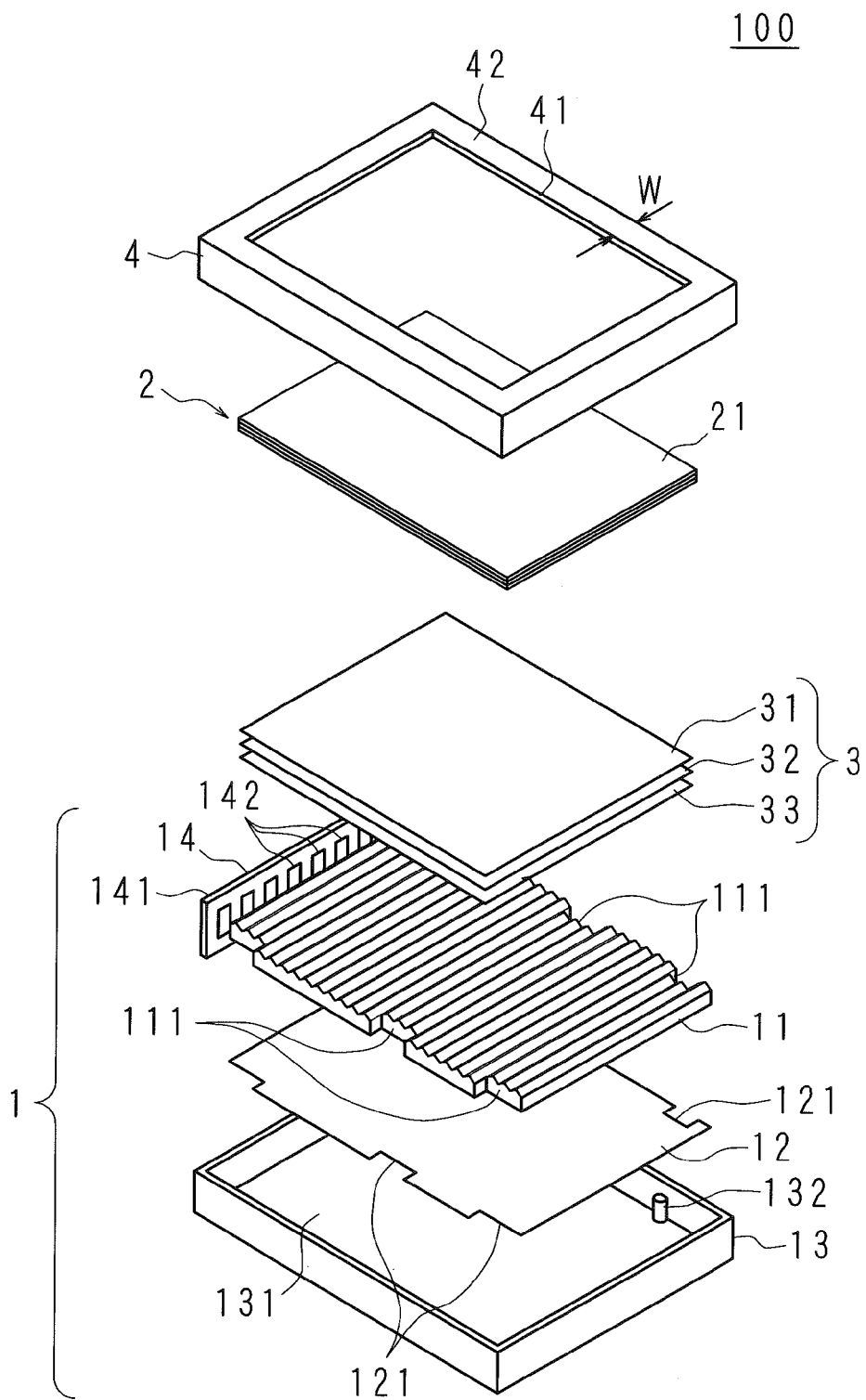
FIG. 9 is an illustrative view illustrating a case where one surface of the light guide plate is formed to have a shape of lens.
Figure 10:
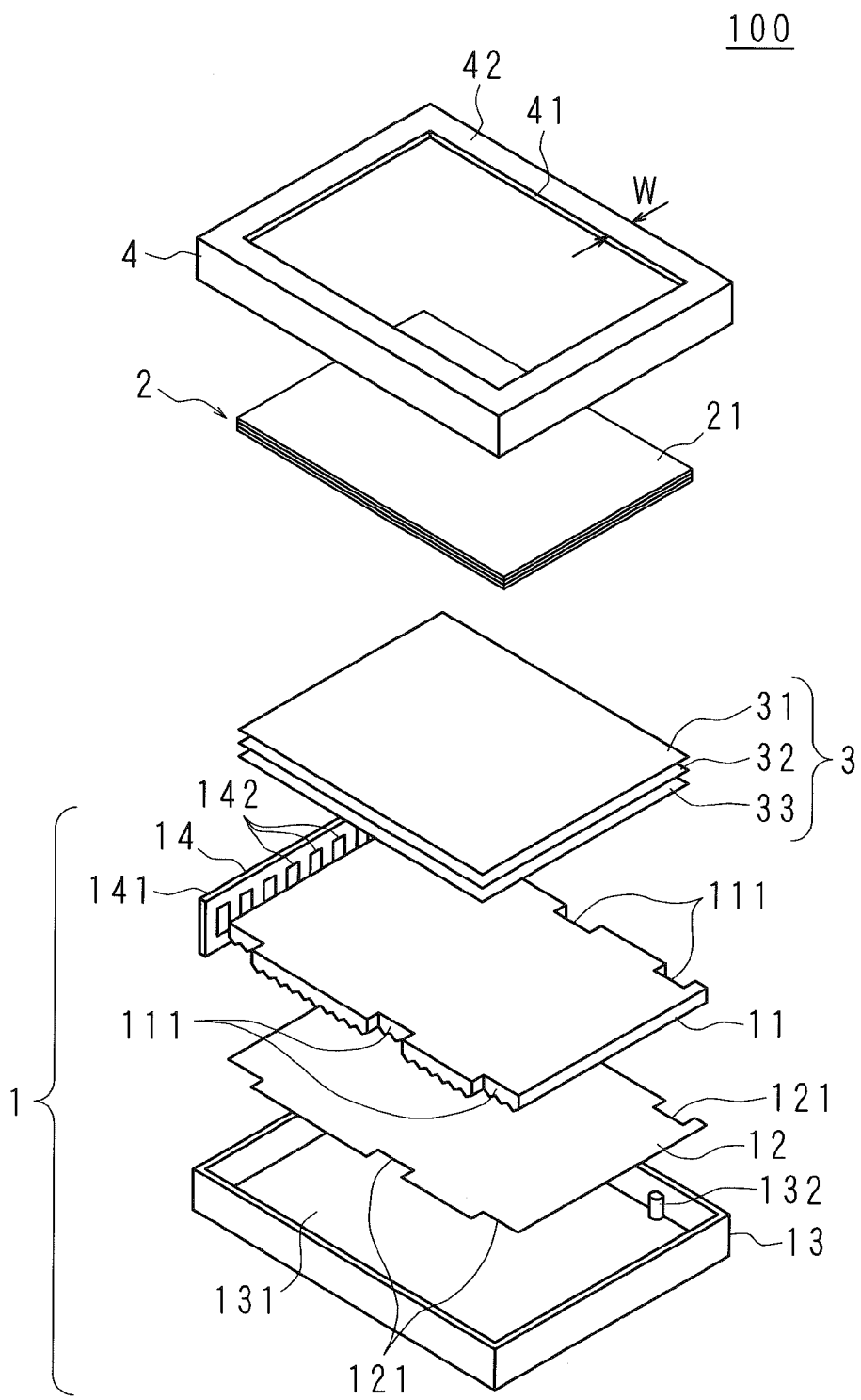
FIG. 10 is an illustrative view illustrating a case where the other surface of the light guide plate is formed to have a shape of lens.

FIG. 7 is a partial schematic view from the direction of stack, schematically illustrating the state of accommodating a light guide plate 11 and a reflection sheet 12 in a liquid-crystal television 100 according to another embodiment of the present invention.

As illustrated in FIG. 7, it may also be configured that the positioning part 132, the cut-out part 111 and the cut-out part 121 may have different shapes. For example, the positioning part 132 may have a cylindrical shape with its central axis being parallel to the direction of stack, the cut-out part 111 may have a triangular shape in the direction of stack, and the cut-out part 121 may have a U shape in the direction of stack.

It may also be configured that the reflection sheet recess 122 has wider area than the light guide plate recess 112, and that the cut-out part 121 of the reflection sheet 12 is aligned with the position of the cut-out part 111 of the light guide plate 11 in the direction of stack.

Parts similar to those in Embodiment 1 will be denoted by the same reference numbers and will not be described in detail.

Embodiment 4

Furthermore, the liquid-crystal television 100 according to the present invention is not limited to the configuration described above. It may, for example, also be configured that the shape of the cut-out part 121 in the direction of stack is determined by the position of the light source unit 14, that is, by the incident direction of light entering the light guide plate 11.

FIG. 8 is a partial schematic view from the direction of stack, schematically illustrating the state of accommodating a light guide plate 11 and a reflection sheet 12 in a liquid-crystal television 100 according to Embodiment 4 of the present invention. In FIG. 8, the arrow indicates the incident direction of light entering the light guide plate 11.

In Embodiment 4, a positioning part 132 has a cylindrical shape with its central axis being parallel to the direction of stack, and a cut-out part 111 has a U shape in the direction of stack. It is so configured that the positioning part 132 is located in a light guide plate recess 112 of the light guide plate 11, and the positioning part 132 is enclosed by the cut-out part 111 in the case where the light guide plate 11 is accommodated in a back housing 13.

Moreover, as for a cut-out part 121 of a reflection sheet 12, the shape of the portion close to the side where the incident light enters, i.e. the side of the incident light, is different from the portion far from the side of the incident light. More specifically, the cut-out part 121 has different shapes for a cut-out part 121A closer to the side of the incident light and a cut-out part 121B farther from the side of the incident light, having a partially enlarged shape at the portion closer to the side of the incident light. In other words, the area of the reflection sheet recess 122 defined by the cut-out part 121 is partially enlarged near the side of the incident light.

In other words, as illustrated in FIG. 8, comparing the area of the portion corresponding to the cut-out part 121A with the area of the portion corresponding to the cut-out part 121B, the area of the portion corresponding to the cut-out part 121A, which is closer to the side of the incident light, is larger.

The liquid-crystal television 100 according to Embodiment 4 of the present invention has the configuration as described above, which can solve a problem of unevenness in light occurring in the vicinity of the cut-out part 111, or a problem of the reduced area of the display window 41 resulting from the increased width W in the frame part 42 to conceal such unevenness in light, as described above.

Among the light entering the light guide plate 11 from the light source unit 14, the light passing through the side surface concerning the cut-out part 111 which is not mirror-finished causes irregular reflection at the side surface. Thus, the portion along the side surface concerning the cut-out part 111 is excessively illuminated compared to the other parts of the light guide plate 11, causing unevenness in luminance.

The amount of the light passing through the side surface concerning the cut-out part 111 which is not mirror-finished, among the light entering the light guide plate 11 from the light source unit 14, is larger in the cut-out part 111A closer to the side of the incident light compared to in the cut-out part 111B farther from the side of the incident light. Thus, unevenness in luminance due to such irregular reflection occurs more at the cut-out part 111A.

To address the problem, in the liquid-crystal television 100 according to Embodiment 4 of the present invention, the area of the portion corresponding to the cut-out part 121A which is closer to the side of the incident light is formed to be larger than the area of the portion corresponding to the cut-out part 121B within the reflection sheet recess 122.

In other words, reflection of the excessive light to the liquid-crystal display panel 2 at the portion along the side surface of the cut-out part 111 is restricted more at the cut-out part 111A closer to the side of the incident light compared to the cut-out part 111B farther from the side of the incident light, which can address the problem of unevenness in luminance due to irregular reflection frequently occurring at the cut-out part 111A, as described above.

The other configurations, features and functions of the liquid-crystal television 100 according to Embodiment 4 of the present invention are similar to those for the liquid-crystal television 100 according to Embodiment 1 of the present invention, and thus will not be described in detail.

Also, the parts similar to those in Embodiment 1 will be denoted by the same reference numbers and will not be described in detail.

Though an example where the positioning part 132 is formed integrally with the housing 13 has been described above, the present invention is not limited thereto. For example, a case where the positioning part 132 is attached to the housing 13 as a member separate from the housing 13 may also be employed.

Moreover, the present invention is not limited to the description above. It may also be configured that a mirror finish is applied on the side surface concerning the cut-out part 111 of the light guide plate 11. This can prevent irregular reflection at the side surface concerning the cut-out part 111. Here, the only cause of unevenness in luminance occurring around the cut-out part 111 would be the light emitted to the outside through the side surface concerning the cut-out part 111 and entering again to the light guide plate 11 after being reflected by the positioning part 132. Thus, the amount of light which causes such unevenness in luminance may be reduced. Therefore, occurrence of unevenness in luminance around the cut-out part 11 may be suppressed.

The bottom of the housing is characterized by having a constant reflection spectral distribution characteristic. This can suppress the occurrence of color unevenness caused by the light, reflected at the bottom of the housing, reflecting a large amount of light of an unwanted color such as blue, red or the like.

Furthermore, the present invention is not limited to the description above. It may also be configured, for example, that the bottom 131 of the housing 13 is located away from the reflection sheet 12 by a predetermined distance in the direction of stack. As a specific example, a black block-like spacer may be interposed between the reflection sheet 12 and the bottom 131. Accordingly, in the case where the light concerning unevenness in luminance occurring at the cut-out part 111 of the light guide plate 11 enters the bottom 131 of the housing 13 through the light guide plate recess 112 of the light guide plate 11 and the reflection sheet recess 122 of the reflection sheet 12, such light can be absorbed by the side surface of the spacer while the area of the bottom 131 that can absorb such light is increased, further increasing the amount of absorption of the light concerning unevenness in luminance.

Furthermore, the present invention is not limited to the description above. For example, the above-described one surface of the light guide plate 11 may be formed to have a shape of a lens. This enhances the straightness of the light entering the light guide plate 11 from the light sources 142, 142 . . . 142, which increases the amount of light emitted through the above-described one surface of the light guide plate 11 and reduces the amount of light travelling toward the cut-out part 111 side of the light guide plate 11. Accordingly, the occurrence of unevenness in luminance around the cut-out part 111 can be suppressed.

Moreover, the present invention is not limited to the description above. For example, the above-described other surface of the light guide plate 11 may be formed to have a shape of a lens. This enhances the straightness of the light entering the light guide plate 11 from the light sources 142, 142 . . . 142, which increases the amount of light emitted through the above-described one surface of the light guide plate 11 and reduces the amount of light travelling toward the cut-out part 111 side of the light guide plate 11. Accordingly, the occurrence of unevenness in luminance around the cut-out part 111 can be suppressed.

Furthermore, the present invention is not limited to the description above. It may also be configured, for example, that the light sources 142, 142, . . . 142 located on the short side of the light guide plate 11 are positioned closer to the center of the light guide plate 11 compared to the cut-out parts 111, 111, . . . 111 formed on the both long sides of the light guide plate 11, that is, positioned closer to the center of the light guide plate 11 in the facing direction of both long sides of the light guide plate 11, i.e. the short-side direction of the light guide plate 11. This can reduce the rate of light travelling toward the cut-out parts 111, 111 . . . 111 of the light entering the light guide plate 11 from the light sources 142, 142 . . . 142, which can suppress the occurrence of unevenness in luminance around the cut-out parts 111, 111 . . . 111.

In addition, the present invention is not limited to the description above. It may be configured, for example, that the light sources 142, 142, . . . 142 located on the short sides of the light guide plate 11 are positioned closer to the center of the reflection sheet 12 compared to the cut-out parts 121, 121, . . . 121 formed on both long sides of the reflection sheet 12, that is, positioned closer to the center of the reflection sheet 12 in the facing direction of both long sides of the reflection sheet 12, i.e. the short-side direction of the reflection sheet 12.

The cut-out part 111 of the light guide plate 11 is included inside of the cut-out part 121 of the reflection sheet 12 in the direction of stack. By the configuration described above, the rate of the light travelling toward the cut-out parts 111, 111, . . . 111 of the light guide plate 11 among the light entering the light guide plate 11 from the light sources 142, 142, . . . 142 can further be reduced, which can further suppress the occurrence of unevenness in luminance around the cut-out parts 111, 111, . . . 111.

What is claimed is:

1. A light source device comprising a light guide plate, a reflection sheet for reflecting light entering the light guide plate to one surface side thereof, the reflection sheet being located on the other surface side of the light guide plate, and a housing in which the light guide plate and the reflection sheet are stacked and accommodated, comprising:
    a positioning part located at an inside side surface of the housing for determining positions of the light guide plate and the reflection sheet in the housing; and
    a cut-out part formed at each of the light guide plate and the reflection sheet to be corresponding to the positioning part,
    wherein the cut-out part of the light guide plate is formed at an edge of a side surface of the light guide plate and is configured to be included in the cut-out part of the reflection sheet in a direction of the stack.

2. The light source device according to claim 1, wherein an area of a recess defined by the cut-out part of the reflection sheet is partially enlarged in the direction of the stack based on an incident direction of the light.

3. The light source device according to claim 1, wherein the cut-out part of the reflection sheet has a shape similar to a shape of the cut-out part of the light guide plate in the direction of the stack.

4. The light source device according to claim 1, wherein the cut-out part of the light guide plate has a shape similar to a shape of the positioning part in the direction of the stack.

5. The light source device according to claim 1, wherein a bottom of the housing has a reflectance ratio lower than a reflectance ratio of the reflection sheet.

6. The light source device according to claim 5, wherein a film having a reflectance ratio lower than the reflectance ratio of the reflection sheet is formed at the bottom of the housing.

7. The light source device according to claim 1, wherein the light guide plate is subjected to a mirror finish on a side surface concerning the cut-out part.

8. The light source device according to claim 5, wherein the bottom of the housing has a constant reflection spectral distribution characteristic.

9. The light source device according to claim 5, wherein the bottom of the housing is located away from the reflection sheet in the direction of the stack.

10. The light source device according to claim 1, wherein said one surface of the light guide plate has a shape of a lens.

11. The light source device according to claim 1, wherein the other surface of the light guide plate has a shape of a lens.

12. The light source device according to claim 1, wherein
    the light guide plate has a rectangular shape,
    the cut-out part of the light guide plate is formed at an edge of one side surface of the light guide plate, and
    the light source device comprises a light source arranged on a side surface adjacent to said one side surface and located closer to a center of the light guide plate compared to the cut-out part in a direction in which said one side surface and another side surface opposite to said one side surface oppose to each other.

13. The light source device according to claim 1, wherein
    the reflection sheet has a rectangular shape,
    the cut-out part of the reflection sheet is formed at a portion of one edge of the reflection sheet, and
    the light source device comprises a light source arranged on an edge side adjacent to said one edge and located closer to a center of the reflection sheet compared to the cut-out part in a direction in which said one edge and another edge opposite to said one edge oppose to each other.

14. A display device, comprising:
    the light source device according to claim 1; and
    a display panel located on one surface side of the light guide plate and displaying an image using light entering through the light guide plate.

15. The light source device according to claim 1, wherein the cut-out part of the light guide plate has a U-shape in the thickness direction of the light guide plate.

16. The light source device according to claim 1, wherein the cut-out part of the reflection sheet has a U-shape in the thickness direction of the reflection sheet.

17. The light source device according to claim 1, wherein the positioning part has a cylindrical shape with a central axis of the positioning part parallel to the direction of the stack.

* * * * *